July 21, 1953 J. H. FRIEDMAN 2,645,955
OUTBOARD BEARING FOR METAL ROLLING APPARATUS
Filed Feb. 13, 1951 3 Sheets-Sheet 3
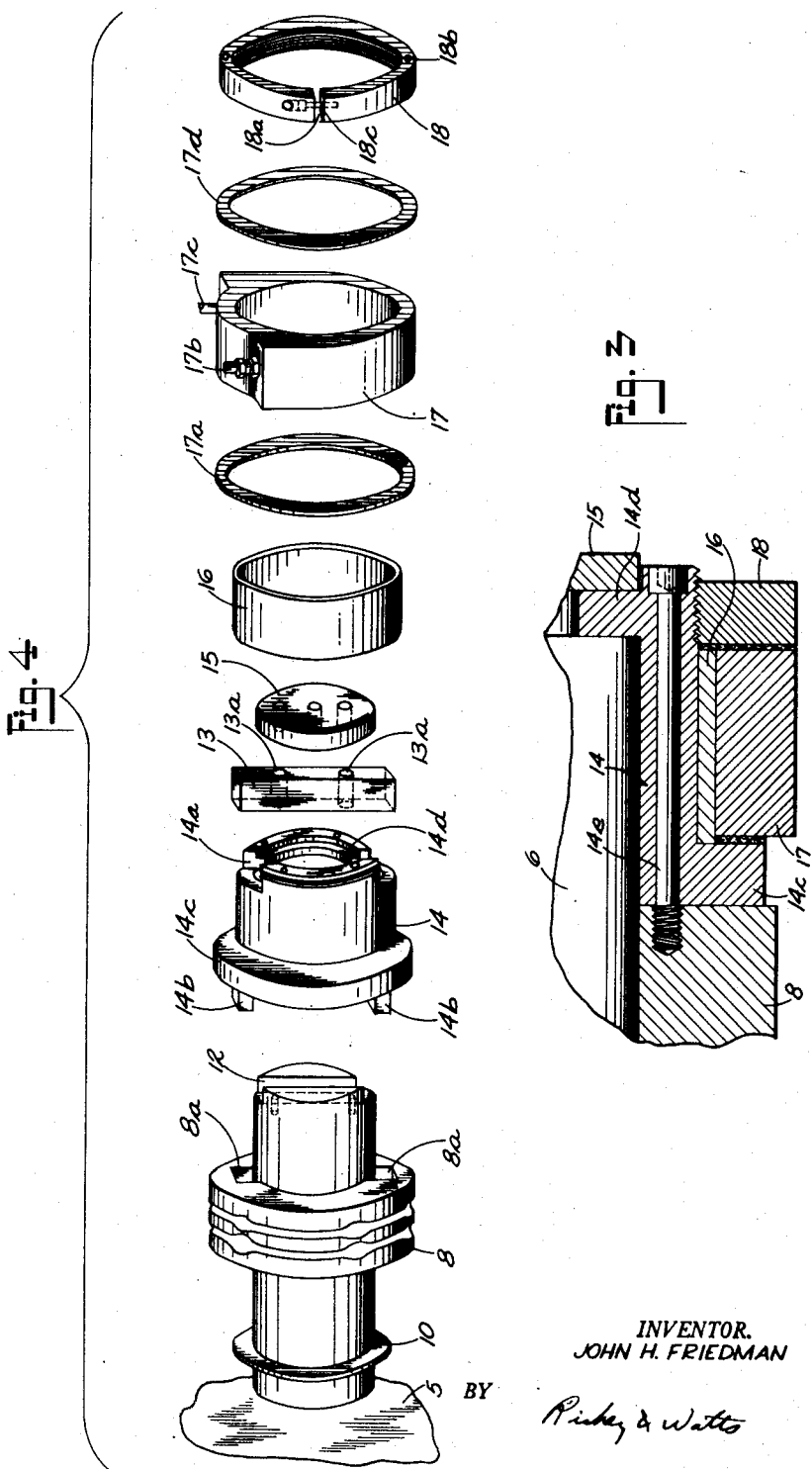
INVENTOR.
JOHN H. FRIEDMAN
BY
ATTORNEYS Patented July 21, 1953

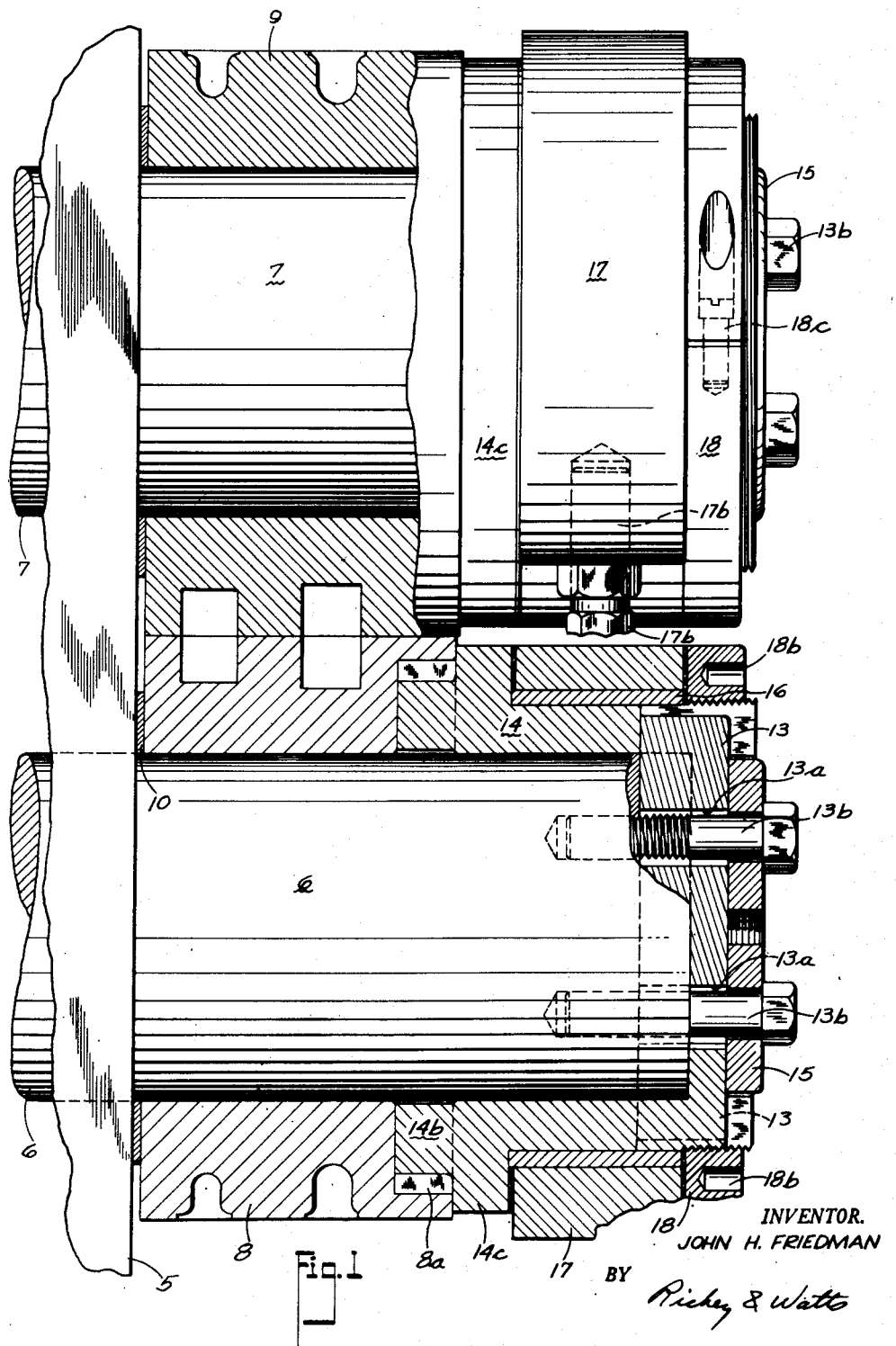

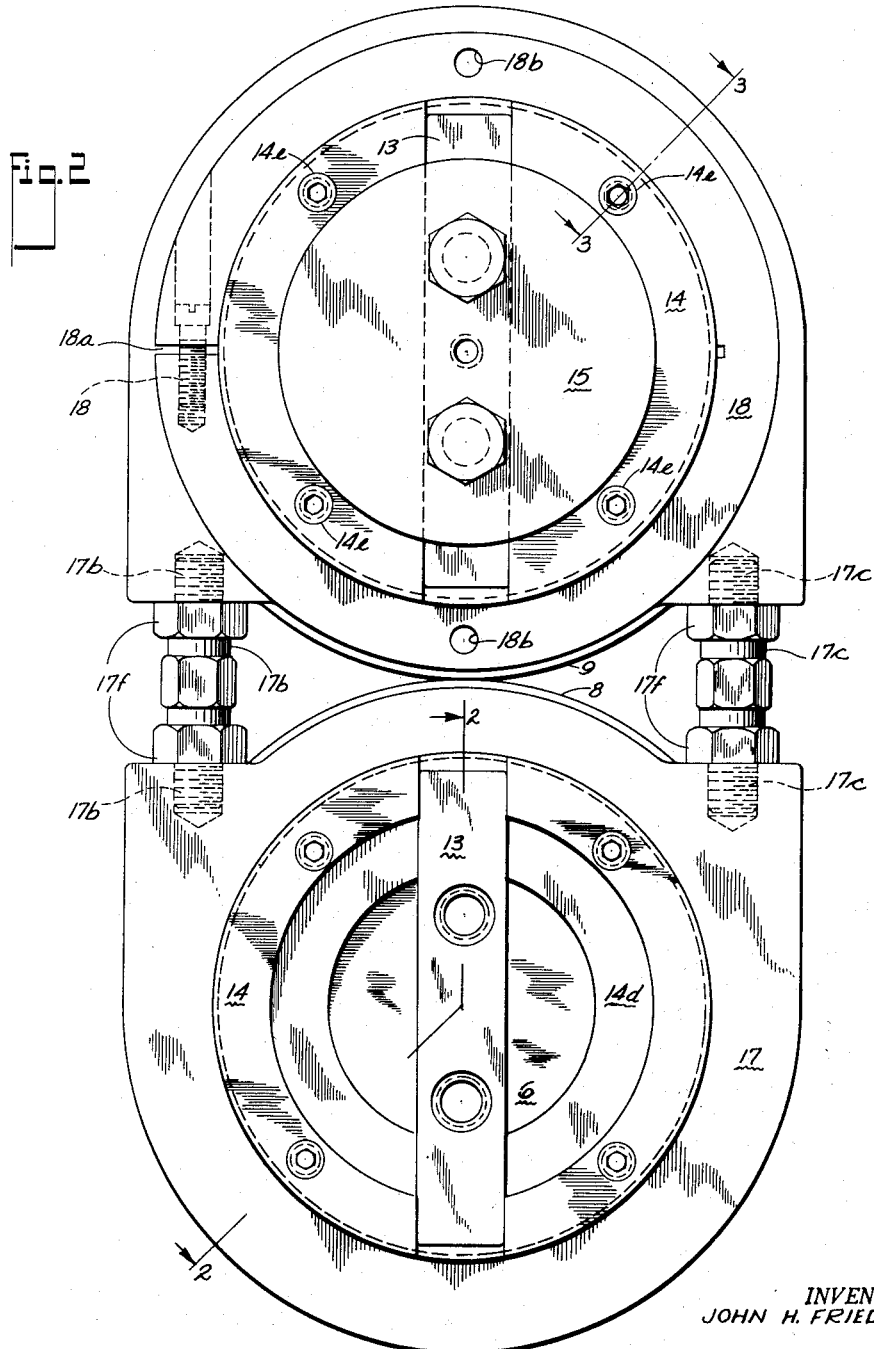

2,645,955

UNITED STATES PATENT OFFICE 2,645,955

OUTBOARD BEARING FOR METAL ROLLING APPARATUS

John H. Friedman, Tiffin, Ohio, assignor to The National Machinery Company, Tiffin, Ohio, a corporation of Ohio Application February 13, 1951, Serial No. 210,735

6 Claims. (Cl. 80—55)

This invention relates to rolling mills and more particularly to a mill of the gap type like that disclosed in my copending application Serial No. 168,218, filed June 15, 1950.

With the advent of mills of the larger sizes of the type above referred to and along with the demand for close dimensional tolerances in rolling, there has developed the need for apparatus to insure against roll shaft deflection. It is among the objects of the present invention to provide means for preventing roll shaft deflection and at the same time retain the advantages resulting from the mounting of the rolls at the exterior of the mill frame. It is a further object of my invention to provide a mill according to the preceding objects that will insure against roll deflection and at the same time accommodate the spacing adjustment of one roll with respect to the other. It is a further object of my invention to provide a mill according to the preceding objects wherein the roll shaft deflection is prevented by apparatus which does not adversely affect the roll mounting from the standpoint of accessibility for roll change and service. Further advantages relating to efficiency in operation and economy of manufacture will appear from the following description and the appended drawings wherein:

Fig. 1 is an elevation with parts in section of a roll shaft bearing structure made according to the present invention.

Fig. 2 is an elevation of the bearing structure looking towards the ends of the roll shafts.

Fig. 3 is a sectional view taken on the plane indicated at 3—3 of Fig. 2.

Fig. 4 is a composite perspective view showing the roll shaft and the bearing elements mounted thereon.

Referring to the drawings, the frame of the rolling mill is indicated at 5 in Fig. 1 and the roll shafts 6 and 7 project therefrom. The roll shafts are geared to each other and are arranged to be rotated in a cyclic fashion one revolution and then brought to a stop as disclosed in detail in my said copending application. Gap rolls 8 and 9 are arranged adjacent the frame 5 on the shafts 6 and 7 respectively. Thrust washers as at 10 and 11 are disposed between the frame and the rolls.

The portions of the roll shafts which project beyond the frame have a greater axial extent than the axial extent of the rolls 6 and 7 and the shaft portions beyond the rolls are secured to each other to prevent shaft deflection. The end face of each roll shaft is provided with a transverse keyway 12 to receive a key 13. A driving sleeve 14 is fitted on the end of the roll shaft and is slotted as at 14a so that the end portions of key 13 fit in the slots 14a and transmit the roll shaft rotation to the sleeve 14. The end of the sleeve 14 remote from slots 14a is provided with axially extending lugs 14b which fit in complementary recesses 8a in the end face of the roll. The lug end of the sleeve is provided with a shoulder or collar 14c bearing against the end face of the roll. An internal shoulder 14d on the sleeve bears against the end face of the roll shaft (see Fig. 3). To hold the sleeve 14 in driving position with respect to the roll, the sleeve is bored axially to receive the through bolts 14e.

To hold the key 13 in driving position, it is drilled as at 13a to receive bolts 13b threaded into the roll shaft. A cover plate 15 is disposed over the key 13 and is proportioned to overhang the internal shoulder 14d of the sleeve 14. The bolts 13b pass through the cover plate 15 and thence through the key 13 to hold said parts assembled on the roll shaft. A bushing 16 of bronze or other suitable bearing material is fitted on the exterior of the sleeve 14 and the bushing 16 is in turn surrounded by a bearing block 17. A thrust washer 17a is disposed between the bearing block 17 and the shoulder 14c of the sleeve 14. A similar thrust washer 17d is disposed between the bearing block 17 and a clamping ring 18. The ring 18 is split as at 18a and is internally threaded so as to be turned onto the outer end of the sleeve 14 which is also threaded. Openings 18b are provided in the ring 18 to receive a spanner wrench for tightening the ring 18 in place. After the ring 18 is turned down by the spanner wrench, a gap bolt 18c is tightened to securely clamp the ring 18 in place.

Deflection of roll shaft 6 with respect to shaft 7 while rolling a blank is prevented by securing the upper and lower bearing blocks 17 to each other. Tie bolts 17b and 17c are threaded into the bearing blocks 17. The mid portion of the tie bolts 17b and 17c is provided with a polygonal cross section so that the tie bolts may be turned to move the bearing blocks 17 toward or away from each other in the fashion of a turnbuckle. Lock nuts 17f lock the tie bolts in their adjusted positions. The adjustability of the tie bolts 17b thus accommodates the adjustment of the roll shafts 6 and 7 with respect to each other. With the construction of the instant invention the two bearing blocks 17 and the sleeves 14 may be quickly removed and the rolls changed without disturbing the mounting of the roll shafts in the frame. The bearing blocks being connected by the tie bolts permits a preloading of the rolls which effectively eliminates roll shaft deflection and insures the maintenance of dimensions throughout a large number of rolling operations.

Although I have described one form of my invention in considerable detail, it will be appreciated that numerous modifications may be made within the scope of the following claims.

I claim:

1. A mill comprising a frame, a pair of roll shafts projecting from the frame, a sleeve fixed on each roll shaft at the outer end thereof, a bearing surrounding each of said sleeves, means to connect said bearings to each other, a roll on each shaft intermediate the frame and sleeve and axially extending interlocking portions on said sleeve and roll to fix the roll with respect to the shaft.

2. A mill comprising a frame, a pair of parallel roll shafts projecting from the frame, a transverse keyway at the end of each shaft, a member having key slots complementary to said keyway at the end of each shaft, a key in said keyway having the ends thereof extending into said slots, a bearing surrounding each of said members, adjustable means connecting said bearings to each other, a roll on each shaft between the bearing and frame and axially extending means on the member and roll to fix the roll to the member in driving relation.

3. A mill having a frame and a pair of roll shafts projecting therefrom, a sleeve keyed to the outer end of each of said projecting shafts, a bearing surrounding each of said sleeves, tie rods connecting said bearings to each other and a roll on each shaft keyed to the sleeve carried thereby.

4. A mill comprising a frame, a pair of cooperating roll shafts projecting from the frame, a sleeve keyed on each roll shaft at the outer end thereof, a bearing surrounding each of said sleeves, means to connect said bearings to each other, a roll on each shaft intermediate the frame and sleeve, spaced recesses in the end face of each roll, and axially extending lugs on said sleeves fitting said recesses to fix the roll in driving relation with respect to the shaft.

5. A mill comprising a frame, a pair of parallel roll shafts with the end portions thereof projecting from the frame, a transverse keyway at the end of each projecting shaft, a member having key slots in alignment with said keyway at the end of each shaft, a key in said keyway proportioned to extend into said slots, a bearing block surrounding each of said members, adjustable means connecting said bearing blocks, a roll on each shaft between the bearing block and frame, axially extending means on the member and roll to fix the roll to the member in driving relation.

6. A mill having a frame and a pair of roll shafts projecting therefrom, a sleeve surrounding the outer end of each of said projecting shafts, a bearing block surrounding each of said sleeves, adjustable tie rods connecting said bearings to each other and a roll on each shaft fixed to the sleeve carried thereby.

JOHN H. FRIEDMAN.

References Cited in the file of this patent

UNITED STATES PATENTS

| Number | Name | Date |
|---|---|---|
| 355,390 | Daniels | Jan. 4, 1887 |
| 632,115 | Hicks | Aug. 29, 1899 |